United States Patent
Ikeda

(10) Patent No.: US 8,953,197 B2
(45) Date of Patent: Feb. 10, 2015

(54) IMAGE PROCESSING SYSTEM, IMAGE INPUTTING APPARATUS, DISPLAY CONTROLLING APPARATUS, MANAGEMENT METHOD AND PROGRAM FOR IMAGE PROCESSING SYSTEM, AND STORAGE MEDIUM

(75) Inventor: Yasuyuki Ikeda, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 628 days.

(21) Appl. No.: 12/929,387

(22) Filed: Jan. 20, 2011

(65) Prior Publication Data

US 2011/0188072 A1 Aug. 4, 2011

(30) Foreign Application Priority Data

Feb. 3, 2010 (JP) ................. 2010-022285

(51) Int. Cl.
*G06F 3/12* (2006.01)
*H04N 1/32* (2006.01)
*H04N 1/00* (2006.01)

(52) U.S. Cl.
CPC ......... *H04N 1/32502* (2013.01); *H04N 1/0044* (2013.01); *H04N 1/00469* (2013.01); *H04N 1/32529* (2013.01); *H04N 1/32539* (2013.01); *H04N 1/00347* (2013.01); *H04N 2201/0039* (2013.01); *H04N 2201/0082* (2013.01); *H04N 2201/0094* (2013.01); *H04N 2201/33321* (2013.01)
USPC .......................................... 358/1.15; 358/1.1

(58) Field of Classification Search
None
See application file for complete search history.

(56) References Cited

U.S. PATENT DOCUMENTS

| 5,835,789 A | 11/1998 | Ueda et al. |
| 6,256,107 B1 | 7/2001 | Toda |
| 7,667,876 B2 | 2/2010 | Saitoh et al. |
| 7,903,277 B2 * | 3/2011 | Cudd et al. ................... 358/1.18 |

(Continued)

FOREIGN PATENT DOCUMENTS

| EP | 0 893 753 A2 | 1/1999 |
| JP | 08-204703 | 8/1996 |

(Continued)

OTHER PUBLICATIONS

European Patent Office Communication issued on Jun. 24, 2011 for European Patent Application No. 11153012.7.

(Continued)

*Primary Examiner* — Marcus T Riley

(57) ABSTRACT

An image processing system, connecting a plurality of image forming apparatuses via a network for outputting an input image using one of image forming apparatuses, includes an output-specifying information obtaining unit that obtains output-specifying information including to-be-output image data and information designating one of the image forming apparatuses as an output destination to output the to-be-output image data; an output-able size information obtaining unit to obtain output-able size information linking information identifying each image forming apparatus and output-able image size information at each image forming apparatus; an output-able size information display unit to display an output-able image size of each image forming apparatuses on a display area; an image data converter to convert image data to a data format suitable for the designated image forming apparatus; and an image data transmission unit to transmit the converted image data to one of the image forming apparatuses designated as the output destination.

14 Claims, 7 Drawing Sheets

(56) References Cited

U.S. PATENT DOCUMENTS

| | | |
|---|---|---|
| 2001/0043357 A1 | 11/2001 | Owa et al. |
| 2004/0184043 A1 | 9/2004 | Hirosugi et al. |
| 2005/0200911 A1 | 9/2005 | Saitoh et al. |
| 2008/0123114 A1 | 5/2008 | Hirosugi et al. |
| 2008/0198401 A1* | 8/2008 | Ushio .................. 358/1.15 |
| 2008/0198421 A1* | 8/2008 | Hirahara et al. .......... 358/403 |
| 2009/0237705 A1 | 9/2009 | Ikeda |
| 2010/0002251 A1* | 1/2010 | Tachibana ................ 358/1.15 |

FOREIGN PATENT DOCUMENTS

| | | |
|---|---|---|
| JP | 2004-289549 A | 10/2004 |
| JP | 2004-289651 A | 10/2004 |
| JP | 2004-304592 A | 10/2004 |
| JP | 2004-318817 A | 11/2004 |
| JP | 2006-260398 A | 9/2006 |
| JP | 2007-060373 | 3/2007 |
| JP | 2007-259060 A | 10/2007 |

OTHER PUBLICATIONS

Japanese Office Action dated Jan. 7, 2014 for corresponding Application No. 2010-022285.

* cited by examiner

| ID | PRINTER NAME | MAX. OUTPUT SIZE | STORING AREA OF DRIVER | |
|---|---|---|---|---|
| 001 | PRINTER A | A0 | ¥¥xxxxx¥xxx¥xx ··· | |
| 002 | PRINTER B | A3 | ¥¥xxxxx¥xxx¥xx ··· | ··· |
| 003 | PRINTER C | B2 | ¥¥xxxxx¥xxx¥xx ··· | |

| | | PREVIEW |
|---|---|---|
| PRINTER NAME | PRINTER A (MAX. A0) ▽ | |
| REDUCTION RATE | 75% ▽ | |
| DIVIDING NUMBER | DIVIDE IN TWO ▽ | |
| EXTRACTION AREA | START POINT / END POINT | |
| | | TRANSMIT |

FIG. 7
(a) 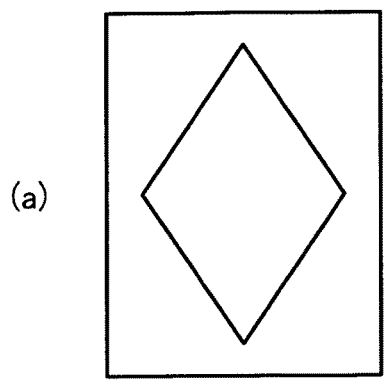
(b) 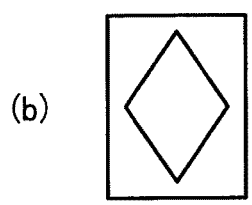
(c) 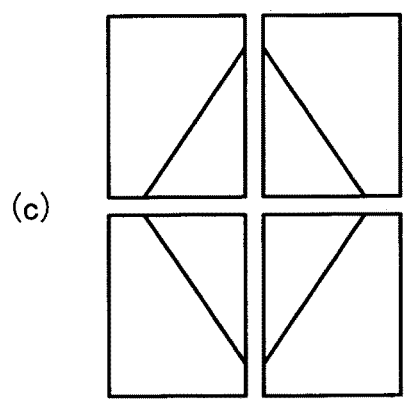
(d) 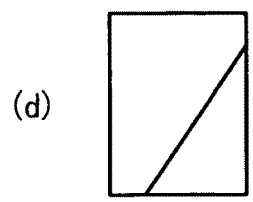

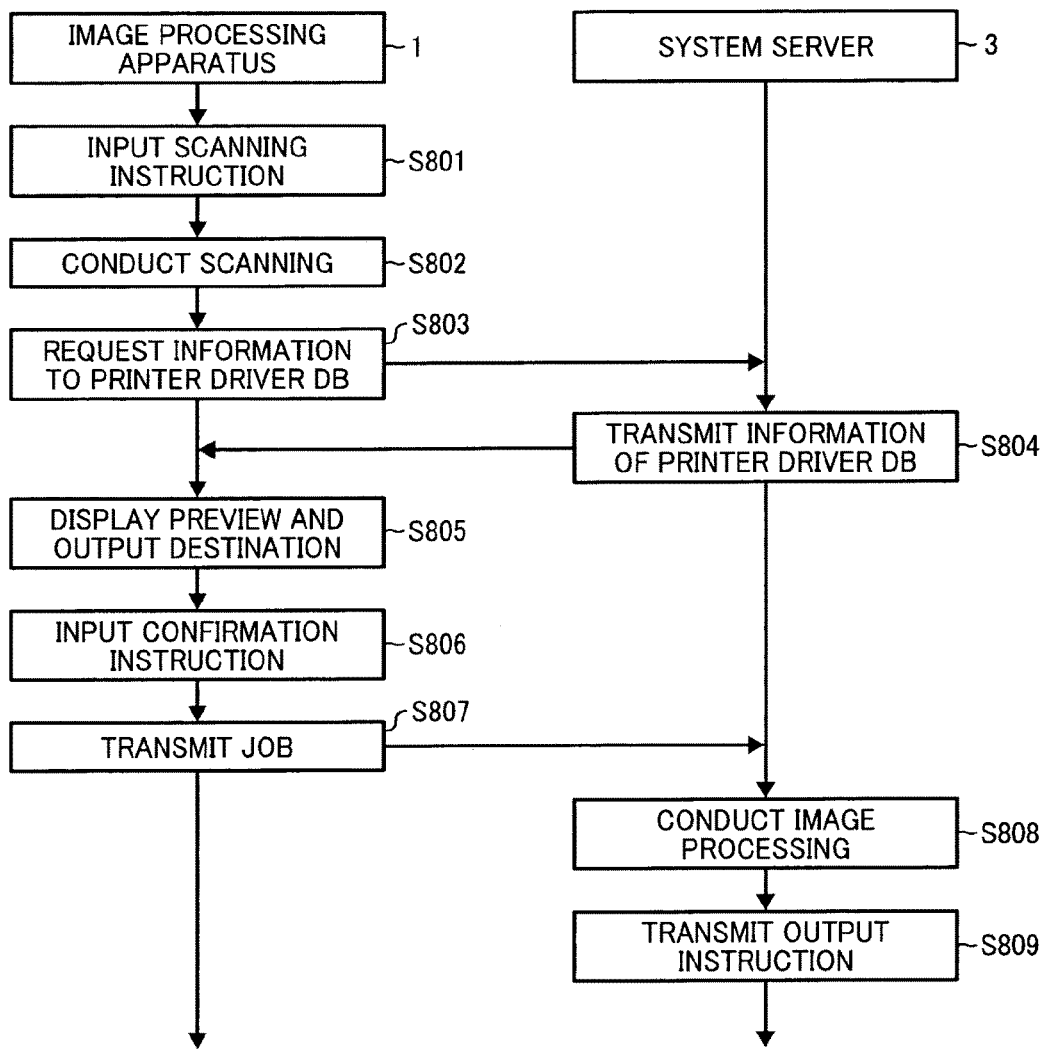

FIG. 11

DESIGNATED OUTPUT DESTINATION CANNOT OUTPUT A0 SIZE.

CHANGE OUTPUT SIZE OR DESIGNATE OTHER OUTPUT DESTINATION.

OK

IMAGE PROCESSING SYSTEM, IMAGE INPUTTING APPARATUS, DISPLAY CONTROLLING APPARATUS, MANAGEMENT METHOD AND PROGRAM FOR IMAGE PROCESSING SYSTEM, AND STORAGE MEDIUM

CROSS-REFERENCE TO RELATED APPLICATIONS

This application claims priority to Japanese Patent Application No. 2010-022285, filed on Feb. 3, 2010 in the Japan Patent Office, which is incorporated by reference herein in its entirety.

BACKGROUND OF THE INVENTION

1. Field of the Invention

The present invention relates to an image processing system, an image inputting apparatus, a display controlling apparatus, and a management method and program for an image processing system, and more particularly, to management of display of an image inputting apparatus when an image is input by a user operating an image inputting apparatus.

2. Description of the Background Art

With a growing trend toward information digitization, image processing apparatuses such as printers and facsimile machines to output digitized information and scanners to digitize documents have become indispensable. Such image processing apparatuses, provided with image capturing, image forming, and communication capabilities, may be configured as a multi-function peripheral (MFP) or multi-functional apparatus useable as a printer, a facsimile machine, a scanner, and a copier.

Further, in image processing systems using digitized documents, the image processing systems accumulate digitized documents in a document management server or send digitized documents to designated destinations. For example, JP-2007-259060-A discloses an image processing system that configures a workflow by combining a scanning function and an information processing function to conduct efficient document accumulation.

Further, large-sized sheets or images such as A0 size sheets can be handled by dividing one large-size image into several sections when displaying a preview of a large-size image. Otherwise, a reduction rate version of the large-size image for preview display becomes too small to recognize on a display screen.

In such image processing systems, when a control panel of the MFP is operated, an image input by a scanning process, or image data already accumulated as image data by a scanning process, may be output from a printer connected to the MFP via a network. Such operation may be referred to as a scan-to-print operation. Different from ordinary copying, the scan-to-print operation is conducted by using different apparatuses for a scanning process and an outputting process. Further, different from the usual printout operation, what the user operates is the MFP.

In such scan-to-print operation, when a scanning operation is conducted for a large-sized sheet such as A0 size or when accumulated image data has a large size such as A0 size, a printer, used as a destination for outputting image data, must have the capability to output large-size images to conduct a suitable image outputting operation such as an image forming operation. However, the most widely used printers typically are capable only of outputting up to A4 to A3 size; printers having a capability of outputting large-size images such as A2 or greater are not so readily available for use.

If the scan-to-print operation is conducted for large-sized image documents or large-size stored-image data (or images accumulated in advance) using printers not capable of outputting large-size images, an error such as outputting only a portion of an image may occur. Further, when the control panel provided to the MFP is operated to conduct a scan-to-print operation, interfaces available to the control panel of the MFP are limited, and an output setting matched to the maximum output-able size of the printer used as an output destination may become difficult to select by operating the control panel of MFP.

SUMMARY

In one aspect of the present invention, an image processing system connecting a plurality of image forming apparatuses via a network for outputting an input image using one of the plurality of image forming apparatuses is devised. The image processing system includes an output-specifying information obtaining unit that, in response to an input operation to an image inputting apparatus, obtains output-specifying information including to-be-output image data and information designating at least one of the image forming apparatuses as an output destination to output the to-be-output image data; an output-able size information obtaining unit to obtain output-able size information linking information identifying each of the plurality of image forming apparatuses and output-able image size information at each of the plurality of image forming apparatuses; an output-able size information display unit to display an output-able image size of each of the plurality of image forming apparatuses on a display area disposed in the image inputting apparatus based on the obtained output-able size information; an image data converter to convert image data, obtained by the output-specifying information obtaining unit, to a data format suitable for the image forming apparatus designated as the output destination; and an image data transmission unit to transmit the converted image data to one of the image forming apparatuses designated as the output destination.

In another aspect of the present invention, an image inputting apparatus, to input an image to an image processing system connecting a plurality of image forming apparatuses via a network for outputting the input image using one of the plurality of image forming apparatuses, is devised. The image inputting apparatus includes an output-specifying information obtaining unit that, in response to an input operation to the image inputting apparatus, obtains output-specifying information including o-be-output image data and information designating at least one of the image forming apparatuses as an output destination to output the to-be-output image data; an output-able size information obtaining unit to obtain output-able size information linking information identifying each of the plurality of image forming apparatuses and output-able image size information at each of the plurality of image forming apparatuses; an output-able size information displaying unit to display an output-able image size of each of the plurality of image forming apparatuses on a display area disposed in the image inputting apparatus based on the obtained output-able size information; and an output-specifying information transmission unit to transmit the obtained output-specifying information to one of the image forming apparatuses designated as the output destination to output the to-be-output image data.

In another aspect of the present invention, a display control apparatus to control a display style of display area, disposed at an image inputting apparatus used for inputting an image to an image processing system connecting a plurality of image forming apparatuses via a network for outputting the input image using one of the plurality of image forming apparatuses, is devised. The display control apparatus includes an output-able size information storage to store output-able size information linking information identifying each of the plurality of image forming apparatuses and output-able image size information at each of the plurality of image forming apparatuses; and an output-able size information transmission unit to transmit the output-able size information to the image inputting apparatus to display the output-able size information on a display area disposed at the image inputting apparatus in response to a request from the image inputting apparatus inputting the to-be-output image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7(a) shows an example input image, and FIGS. 7(b), 7(c), and 7(d) show example output images;

FIG. 8 shows a flowchart explaining operation of the image processing system according to an example embodiment;

FIG. 9 shows example information included in a printer driver database (DB) according to another example embodiment;

FIG. 11 shows an example screen image for reporting an error.

Figure 1:
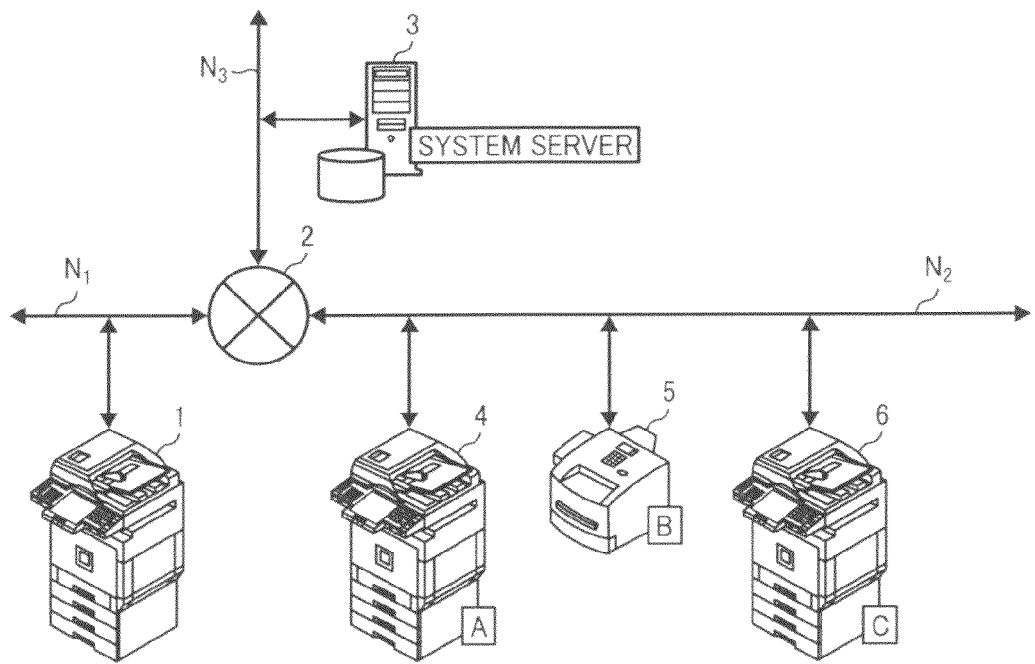
FIG. 1 shows an example operating environment of an image processing system according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner. Referring now to the drawings, an image processing system according to example embodiment is described hereinafter.

First Example Embodiment

In the first example embodiment, as an example of an image processing system, an image scanned by a scanning operation of scanner is output from a printer connected to an image processing apparatus via a public line network such as the Internet.

FIG. 1 shows an example operating environment of image processing system according to the first example embodiment. As shown in FIG. 1, the image processing system may be configured using a network environment having networks such as networks N1, N2, N3 connected each other via a public line network 2 such as the Internet, a phone line, or the like. It should be noted that the number of networks is not limited to three, but any number of networks can be used.

The network $N_1$ may be a user network to input and transmit an image for the image processing system, and an image processing apparatus 1 may be connected to the network $N_1$ to conduct an image inputting operation and transmission operation. As such, the image processing apparatus 1 may function as an image inputting apparatus in the first example embodiment. When the image processing apparatus 1 is further provided with an image capturing function, an image forming function, and a communication function, the image processing apparatus 1 may be devised as a multi-functional apparatus having a function of a printer, a facsimile machine, a scanner, and a copier. Further, the image processing apparatus 1 may be also configured as an apparatus that can scan large-sized sheet or wide sheet such as A0 size and can output large-sized sheet.

The network $N_2$ may be a user network used as image forming operation, in which an image is received and output for the image processing system. For example, image forming apparatuses 4, 5, 6 are connected to the network $N_2$ to conduct an image forming operation by receiving an image, and outputting an image. The image forming apparatuses 4, 5, 6 may be used to output an image using different-size sheets, and the image forming apparatuses 4, 5, 6 may be also referred to as printers A, B, C. Further, for example, one of the image forming apparatuses 4, 5, 6 may be a multi-functional apparatus as similar to the image processing apparatus 1, and one of the image forming apparatuses 4, 5, 6 may be a printer having an image forming function and a communication function. As such, the image forming apparatuses 4, 5, 6 may be used as different types of image forming apparatuses. In the first example embodiment, the image forming apparatuses 4 and 6 may be multi-functional apparatuses, and the image forming apparatus 5 may be a printer, for example.

The network $N_3$ may be a network of service vendor that provides given services for image processing system, and a system server 3 to manage the image processing system is connected to the network $N_3$. For example, the system server 3 converts image data or information input at the image processing apparatus 1 to data format matched to the image forming apparatuses 4, 5, 6 used as an output destination, and conducts a communication processing with an user interface of the image processing apparatus 1 operated by a user. The system server 3 may be also used as workflow server. The image data and image information may be used in this disclosure with a same meaning.

Further, although functions of the system server 3 is implemented using one apparatus in FIG. 1, functions of the system server 3 can be implemented using a plurality of apparatuses. For example, the above-mentioned image conversion processing, and communication processing with a user interface can be implemented using different servers.

With such a configuration, in the image processing system according to the first example embodiment, in response to a scan instruction input to the image processing apparatus 1, the image processing apparatus 1 conducts a scanning to generate image data or information. The scan instruction may be input, for example, by a user. Then, the image processing apparatus 1 transmits an output job including the generated image data and information designating an output destination such as any one of the image forming apparatuses 4, 5, 6 to the system server 3. When the system server 3 receives the output job from the image processing apparatus 1, the system server 3 converts data format of image data included in the output job to a data format matched to one of the image forming apparatuses 4, 5, 6 designated as the output destination, and transmits the image data to the designated image forming apparatus. One of the image forming apparatuses 4, 5, 6, which receives the image data converted by the system server 3, conducts an image forming operation using the converted image data. The output job may be also referred to as output-specifying information, which includes information that specifies data to be used for outputting such as image forming, and information that specifies a specific image processing device or apparatus to output data.

Figure 2:
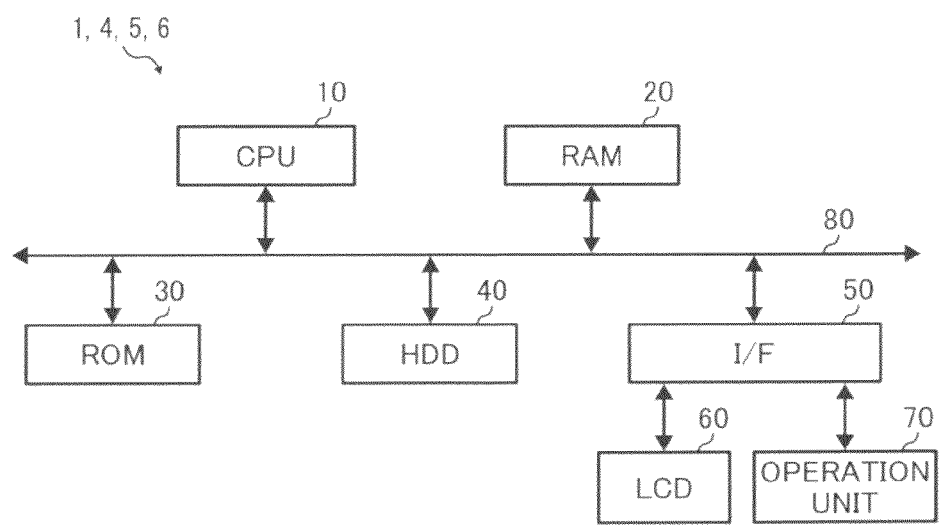
FIG. 2 shows an example block diagram of a hardware configuration of an information processing terminal according to an example embodiment.

A description is now given to an example hardware configuration of the image processing apparatus 1, the system server 3, and the image forming apparatuses 4 to 6 with reference to FIG. 2, which shows a block diagram of an example hardware configuration of the image processing apparatus 1. In the following explanation, a hardware configuration of the image processing apparatus 1 is explained as one example, but the system server 3, and the image forming apparatuses 4 to 6 may have a similar configuration shown in FIG. 2. Further, the image processing apparatus 1, and the image forming apparatuses 4 to 6 may include engines to implement a scanner, a printer, or the like in addition to a hardware configuration shown in FIG. 2.

As shown in FIG. 2, the image processing apparatus 1 may be configured as similar to a general server or personal computer (PC). Specifically, the image processing apparatus 1 may include a central processing unit (CPU) 10, a random access memory (RAM) 20, a read only memory (ROM) 30, a hard disk drive (HDD) 40, and an interface (I/F) 50, which may be connected each other via a bus 80. Further, the I/F 50 is connected to a liquid crystal display (LCD) 60 and an operation unit 70. Further, an engine for implementing a scanner, a printer, or the like can be connected to the bus 80.

The CPU 10 is a computing unit, which controls the image processing apparatus 1 as a whole. The RAM 20 is a volatile memory, to which data or information can be written and read with a high speed, and is used as a working memory when the CPU 10 processes data or information. The ROM 30 is a non-volatile memory used as read only memory, and stores programs such as firmware or the like. The HDD 40 is a non-volatile storage, to which data or information can be written and read, and stores OS (operating system), management programs, application programs, or the like.

The I/F 50 can be used to connect various types of hardware and network to the bus 80, and controls such connection. The LCD 60 is a user interface to display visual information, by which the status of the image processing apparatus 1 can be checked by a user. The operation unit 70 is a user interface such as a keyboard, a mouse, by which information can be input to the image processing apparatus 1 by a user. Further, as above explained with reference to FIG. 1, because the system server 3 is used as a server, a user interface such as LCD 60 and operation unit 70 may be omitted for the system server 3.

In such hardware configuration, programs stored in a storage such as ROM 30, HDD 40, or optical disk can be read and then loaded to the RAM 20, and the CPU 10 runs such programs to control units, by which a software-executing controller can be configured. With a combination of such software-executing controller and hardware, a functional block to operate the image processing apparatus 1, system server 3, or the like can be configured.

Figure 3:
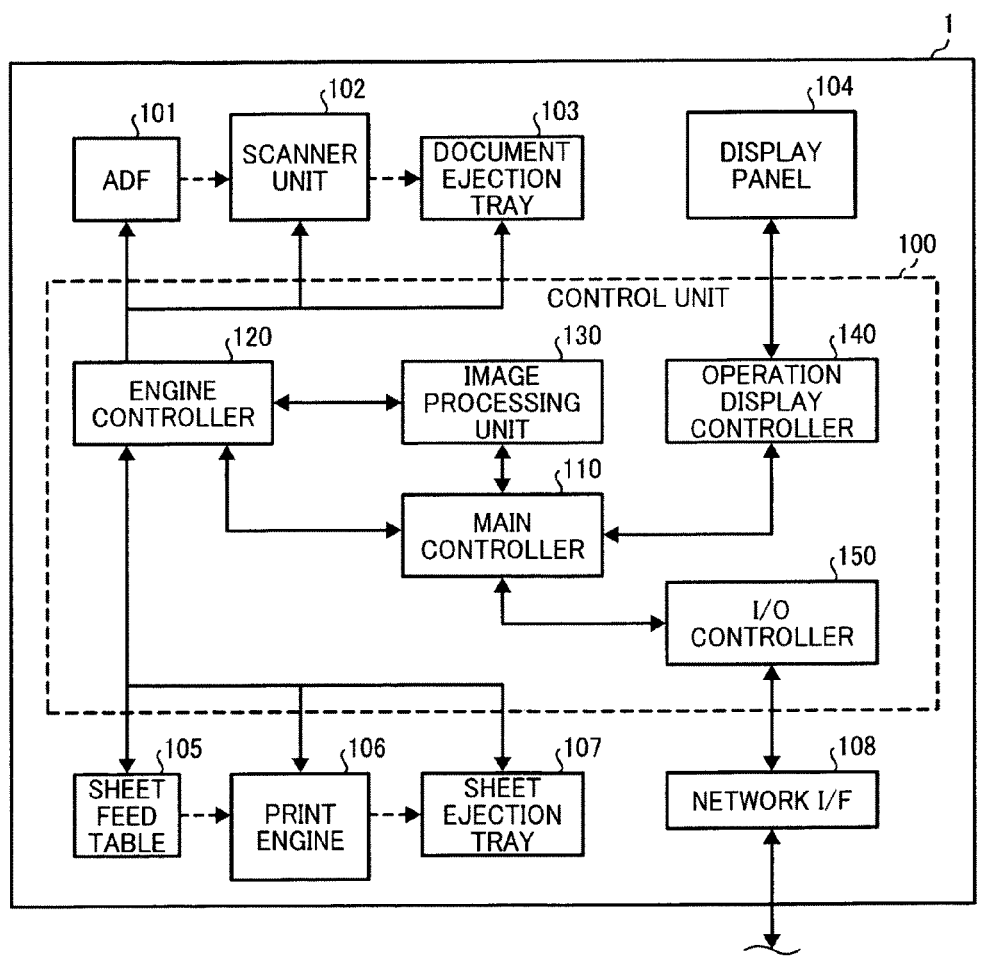
FIG. 3 shows an example block diagram of a functional configuration of an image processing apparatus according to an example embodiment.

A description is now given to a functional configuration of the image processing apparatus 1, and the image forming apparatuses 4, 5, 6 with reference to FIG. 3, which shows an example block diagram of a functional configuration of the image processing apparatus 1. FIG. 3 shows an example functional configuration of the image processing apparatus 1, and such configuration can be similarly applied to the image forming apparatuses 4, 5, 6.

As shown in FIG. 3, the image processing apparatus 1 may include a control unit 100, an automatic document feeder (ADF) 101, a scanner unit 102, a document ejection tray 103, a display panel 104, a sheet feed table 105, a print engine 106, a sheet ejection tray 107, and a network interface (I/F) 108, for example.

Further, the control unit 100 may include a main controller 110, an engine controller 120, an image processing unit 130, an operation display controller 140, and an input/output (I/O) controller 150, for example. As shown in FIG. 3, the image processing apparatus 1 may be configured as a multi-functional apparatus including the scanner unit 102 and the print engine 106. Further, electrical connections are shown by a solid-line arrow, and flow of sheet or document bundle is shown by a dotted-line arrow in FIG. 3.

The display panel 104 may be used as an output interface, which displays status of the image processing apparatus 1 as visual information, and also used as an input interface (or operation unit) to input information to the image processing apparatus 1 with an operation by a user. The display panel 104 may be devised as the LCD 60 and the operation unit 70 shown in FIG. 2, and may be devised as a touch panel, for example.

The network I/F 108 is used as an interface for the image processing apparatus 1 when the image processing apparatus 1 communicates with other apparatus or devices such as a client terminal 2, the system server 3, or the like via a network, and the network I/F 108 may be, for example, Ethernet (registered trademark), USB (universal serial bus) interface, or the like. The network I/F 108 may be devised as the I/F 50 shown in FIG. 2. Further, the network I/F 108 may include a function of facsimile modem, and may function as an interface for facsimile transmission/reception when the image processing apparatus 1 conducts a facsimile transmission/reception via a network.

The control unit 100 may be configured with a combination of software and hardware. Specifically, programs stored in a non-volatile memory such as ROM 30, HDD 40, and/or optical disk may be loaded to a volatile memory such as RAM 20 (hereinafter, memory), and the CPU 10 conducts processing using such programs, by which software-executing controller is configured, and with a combination of software-executing controller and hardware such as an integrated circuit, the control unit 100 may be configured. The control unit 100 may function as a control unit to control the image processing apparatus 1 as a whole.

The main controller 110 controls each unit in the control unit 100 by transmitting instructions to each unit. The engine controller 120 may be used as driver to control and drive the print engine 106, the scanner unit 102, or the like. The image processing unit 130 generates drawing-image information based on to-be-output image data under the control of the main controller 110. The drawing-image information is information used for image drawing when an image forming operation is conducted by the print engine 106, used as an image forming unit. Further, the image processing unit 130 processes data captured and input by the scanner unit 102 to generate image data. Such image data may be stored in a storage area of the image processing apparatus 1 as data obtained by a scanning operation, and may be transmitted to the client terminal 2 or the system server 3 via the network I/F 108.

The operation display controller 140 displays information on the display panel 104, and reports information, input from the display panel 104, to the main controller 110. The input/output controller 150 inputs information, which is input via the network I/F 108, to the main controller 110. Further, the main controller 110 controls the input/output controller 150 to access to the client terminal 2, the system server 3, and other devices connected to a public line via the network I/F 108 and network.

When the image processing apparatus 1 is operated as a printer, the input/output controller 150 may receive a print job via the network I/F 108 at first. Then, the input/output controller 150 transfers the received print job to the main controller 110. When the main controller 110 receives the print job, the main controller 110 controls the image processing unit 130 to generate drawing-image information based on document information or image data included in the print job.

When the image processing unit 130 generates drawing-image information, the engine controller 120 controls the print engine 106 to conduct an image forming operation to a sheet transported from the sheet feed table 105 based on the generated drawing-image information. Specific configuration of the print engine 106 may be, for example, an image forming mechanism using an inkjet method or an image forming mechanism using electrophotography, but not limited thereto. The sheet having received the image forming operation conducted by the print engine 106 may be ejected to the sheet ejection tray 107.

When the image processing apparatus 1 is operated as a scanner, the image processing apparatus 1 may be input with a scanning executing instruction by a user's operation on the display panel 104, or input from an external device such as the client terminal 2 via the network I/F 108. In response to the input of scanning executing instruction, the operation display controller 140 or the input/output controller 150 transfers a scanning executing signal to the main controller 110. The main controller 110 controls the engine controller 120 based on the received scanning executing signal.

The engine controller 120 drives the ADF 101 to transport a document sheet, which is an original document having an image to be captured, set on the ADF 101 to the scanner unit 102. Further, the engine controller 120 drives the scanner unit 102 to capture the image of document transported from the ADF 101. When the document sheet is not set on the ADF 101 but is set directly in the scanner unit 102, the scanner unit 102 captures image of document under the control of the engine controller 120. Accordingly, the scanner unit 102 can be operated as an image capturing unit.

When the scanner unit 102 conducts an image capturing operation, optically scanned document information can be captured by an image capturing device such as charge-coupled device (CCD), and captured-image data is generated based on the optically scanned document information. The engine controller 120 transfers the captured-image data generated by the scanner unit 102 to the image processing unit 130. Under the control of the main controller 110, the image processing unit 130 generates image data based on captured-image data received from the engine controller 120. The image data generated by the image processing unit 130 may be stored in a storage such as HDD 40 in the image processing apparatus 1. As such, the scanner unit 102, the engine controller 120, and the image processing unit 130 may be interlinked to function as a document scanning unit.

The image data generated by the image processing unit 130 may be stored in the HDD 40 or the like, or transmitted to an external apparatus such as the system server 3 via the input/output controller 150 and the network I/F 108 in response to an instruction such as for example user's instruction. Further, the image data generated by a scanning operation is temporarily stored in the RAM 20 to display the image data generated by the scanning operation as a preview on a display area of the display panel 104.

Further, when the image processing apparatus 1 is operated as a copier, the image processing unit 130 generates drawing-image information based on the captured-image data received by the engine controller 120 from the scanner unit 102, or based on the image data generated by the image processing unit 130. As similar to the printer operation, the engine controller 120 drives the print engine 106 based on the drawing-image information. Further, if the drawing-image information and captured-image data use the same format, the captured-image data can be used as the drawing-image information as it is.

Further, when the image processing apparatus 1 is operated as a facsimile machine, as similar to the scanning operation, the image processing unit 130 generates image data. Then, the main controller 110 controls the input/output controller 150 to conduct a facsimile transmission. In the facsimile transmission, under the control of the main controller 110, the input/output controller 150 transmits the image data to a designated transmission destination by driving a facsimile modem function provided for the network I/F 108.

Figures 4, 5, 6:
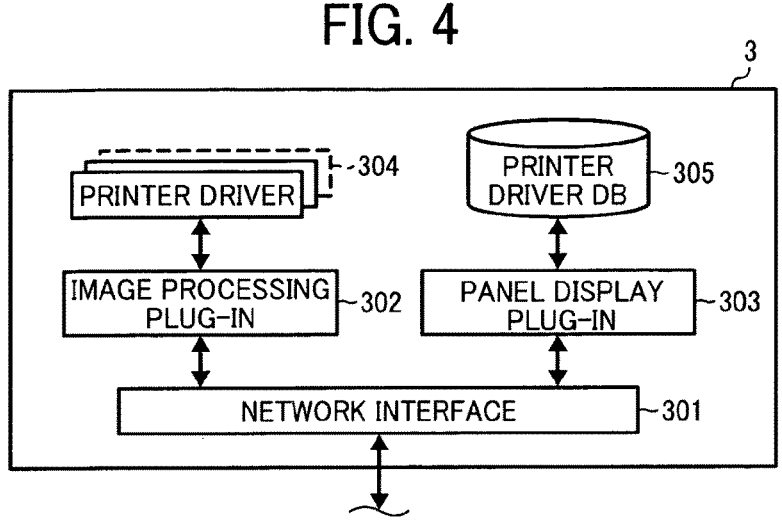
FIG. 4 shows an example block diagram of a functional configuration of a system server according to an example embodiment.
FIG. 5 shows example information included in a printer driver database (DB) according to an example embodiment.
FIG. 6 shows an example display on an output destination designation screen according to an example embodiment.

A description is now given to a functional configuration of the system server 3 with reference to FIG. 4, which shows a block diagram or a functional configuration of the system server 3. As shown in FIG. 4, the system server 3 may include a network interface (I/F) 301, an image processing plug-in 302, a panel display plug-in 303, a plurality of printer drivers 304, and a printer driver database (DB) 305, for example.

As similar to the network I/F 108 of the image processing apparatus 1, the network I/F 301 is an interface of the system server 3 when the system server 3 communicates with other devices such as the image processing apparatus 1, the image forming apparatuses 4, 5, 6, or the like via a network.

Each of the printer drivers 304 may be a printer driver provided for the image forming apparatuses 4, 5, 6, respectively. When the system server 3 receives image data or information as an output job from the image processing apparatus 1, one of the printer drivers 304, tied to one of the image forming apparatuses 4, 5, 6, is used to convert a data format of received image data to a data format matched to one of the image forming apparatuses 4, 5, 6 designated as an output destination.

The printer driver 304 may be implemented using software program installed in a non-volatile storage (e.g., HDD 40) in the system server 3. Specifically, a software program to implement each of printer drivers is installed in a non-volatile storage (e.g., HDD 40) in the system server 3, and the installed software program is loaded to the RAM 20 included in the system server 3, and the CPU 10 runs such software program, by which the printer driver is implemented.

In the system server 3, the image processing plug-in 302 operates the printer driver 304 using the output job input from the image processing apparatus 1. Specifically, when the image processing plug-in 302 receives the output job via the network I/F 301, the image processing plug-in 302 checks designation information of an output destination included in the output job at first, and activates the printer driver 304 matched to any one of the image forming apparatuses 4, 5, 6 designated as the output destination. Then, the image processing plug-in 302 inputs image data included in the output job to the activated printer driver 304, and the printer driver 304 converts data format of the input image data to a data format matched to one of the image forming apparatuses 4, 5, 6 designated as the output destination. As such, the printer driver 304 can be activated by loading the above-mentioned software program to the RAM 20.

In the system server 3, the printer driver DB 305 may be used as a storage to store information of installed printer drivers 304. Example information stored in the printer driver DB 305 is explained with reference to FIG. 5, which shows example information stored in the printer driver DB 305. As shown in FIG. 5, the printer driver DB 305 may store, for example, information of "ID (identification)," "printer name," and "maximum output size" of each printer drivers. The ID identifies each of the printer drivers. The printer name indicates each of the image forming apparatuses 4, 5, 6 matched to each of the printer drivers. The maximum output size indicates a maximum output size of image output-able by each of the image forming apparatuses 4, 5, 6. For example, "printer A" can output "A0" size image, and "printer B" can output "A3" size image. As such, the printer driver DB 305 may store output-able size information for each of image forming apparatuses by linking information of output-able image size with other information of each of image forming apparatuses.

Further, the printer driver DB 305 may be implemented by using the OS of system server 3. For example, information in registry of OS may be used for the printer driver DB 305. By installing the printer driver to the OS of system server 3, information such as printer name and corresponding maximum output-able size of each of image forming apparatuses 4, 5, 6 matched to the installed printer driver may be stored in the registry of OS, by which the printer driver DB 305 is configured.

Existing OS may not be configured to store information on maximum output size of every printer in a registry. However, if a first string of text is attached to a printer name and a second string of text is attached to the maximum output size of the printer (for example, "printer A_A0," "printer B_A3", etc.) and the first string of text and the second string of text are combined and stored in the registry, information on maximum output size of each printer can be stored in the OS as similar to the above described registry of OS shown in FIG. 5.

In the system server 3, the panel display plug-in 303 is used to facilitate display of the display panel 104 of the image processing apparatus 1. By using the panel display plug-in 303, the system server 3 functions as a display control apparatus to control a display of the display panel 104 of the image processing apparatus 1.

In the present embodiment, in response to a request from the image processing apparatus 1, the panel display plug-in 303 reads out information stored in the printer driver DB 305, and transmits the read-out information to the image processing apparatus 1. With such a configuration, the printer names and information on maximum output size of the image forming apparatuses 4, 5, 6 can be displayed on the display panel 104 of the image processing apparatus 1. The present embodiment may include such processing as one of its features.

As described above, in the image processing system according to the first example embodiment, the printer names and maximum output sizes of the image forming apparatuses 4, 5, 6 can be displayed on the display panel 104 of the image processing apparatus 1 by linking the printer names and maximum output sizes of the image forming apparatuses 4, 5, 6.

As for the image processing system, when an image scanning operation is conducted in the image processing apparatus 1 and an image outputting operation is conducted at one of the image forming apparatuses 4, 5, 6 (i.e., output destination), normally-used size sheet such as A4 size can be output at any one the image forming apparatuses 4, 5, 6 without problems because there is little possibility that the image forming apparatuses 4, 5, 6 are not adapted to output such normally-used size sheet. However, image forming apparatuses capable of outputting large-sized or wide-sized sheet such as A0 size may not be so readily available. If an A0-sized document is scanned at the image processing apparatus 1 or a A4-sized document is scanned and then output by enlarging an outputting image size to A0 size, and if the image forming apparatuses 4, 5, 6, designated as output destination, do not have a capability of outputting A0 size, only a portion of the image may be output.

In the image processing system according to the first example embodiment, when a user designates an output destination from one of the image forming apparatuses 4, 5, 6 by operating the display panel 104 of the image processing apparatus 1, a screen, which may be referred to as an output destination designation screen, is displayed on the display panel 104 by displaying the printer names and maximum output sizes while linking the printer names and maximum output sizes. In the image processing system according to the first example embodiment, a graphical user interface (GUI) shown in FIG. 6 may be displayed on the display panel 104 of the image processing apparatus 1 when designating an output destination from the image forming apparatuses 4, 5, 6. Specifically, when designating an output destination from the image forming apparatuses 4, 5, 6, the GUI shown in FIG. 6 is displayed on the display panel 104 and can be operated by a user.

FIG. 6 shows an output destination designation screen, in which a user can select a printer at a "printer name" section displayed on the display panel 104 (hereinafter, output destination designation section), and can input information designating an output destination from image forming apparatuses 4, 5, 6. At the output destination designation section, "printer name" and "maximum output size" shown in FIG. 5 may be displayed by linking the printer name and maximum output size in a given style such as for example "printer A (max. A0)" but not limited such style. With such a configuration, a user can easily check a maximum output-able sheet size at each of the image forming apparatuses 4, 5, 6, which can be designated as the output destination.

Further, at the output destination designation screen, a user can input information on reduction rate, which is used to output an input image at the designated output destination by designating a numerical value at a "reduction rate" section displayed on the display panel 104 (hereinafter, reduction rate designating section). For example, when a A0-image is input and the printer B (maximum output size: A3) is designated as the output destination, the entire image cannot be output on a single sheet at 100% scale (no reduction or enlargement of image). However, by inputting a numerical value in the reduction rate designating section (e.g., 75%), the entire image can be output on one sheet by reducing the size of the image.

Further, at the output destination designation screen, a user can select a dividing number at a "dividing number" section displayed on the display panel 104 (hereinafter, dividing number designating section). The dividing number specifies how many sheets are used to output one image by dividing one image at the designated output destination that outputs an input image. For example, when an A0-image is input and printer B (maximum output size: A3) is designated to output the image on one single sheet, a reduction of about 25% may be required, in which the reduction rate of image may be too small. By selecting a dividing number at the dividing number designating section, A0-image can be output on a plurality of sheets by dividing one image, in which the image can be output at a relatively greater scale.

Further, at the output destination designation screen, a user can input information designating an extraction area, which is an area that is extracted when outputting an input image, by designating or inputting coordinates for "extraction area", "start point", and "end point" at an extraction designating section displayed on the display panel 104 (hereinafter, "extraction designating section"). As such, the extraction designating section designates an extraction portion of image. For example, when an A0-size image is input and when only one portion of the image is required as an output image, coordinate data for the extraction area can be designated at the extraction designating section, by which only an image that is required by a user can be output.

Furthermore, at the output destination designation screen, an image to be output finally (hereinafter, "output image") can be displayed at a "preview" displayed on the display panel 104 (hereinafter, "preview window") with a display style designated by the reduction rate designating section, the dividing number designating section, and/or the extraction designating section.

Further, the output image is displayed on the preview window in consideration of a size of display area of the preview window. For example, the output image may be reduced and displayed in consideration of a size of display area of the preview window, or displayed at the same size as the actual image. If the actual size of the output image is greater than the size of display area of the preview window, a user operates the display panel 104 to change the portion of the output image displayed in the preview window so that an entire portion of the output image can be checked.

With such output destination designation screen, when a user wants to output a large or wide size document such as A0 size at one image forming apparatus after conducting a scanning operation of the large or wide size document, the user can easily check a maximum output size at an image forming apparatus designated as an output destination, and can select an image forming apparatus that can output the large/wide size image.

Further, even if the user cannot select an image forming apparatus that can output the large or wide size image, the user can prevent an unintended output at the output destination by adjusting parameters such as numerical values at the reduction rate designating section, the dividing number designating section, and/or the extraction designating section. With such configuration, an enhanced image outputting function can be preferably provided by the image processing system, and thereby user conveniences can be enhanced.

A description is now given to an example output image when numerical values are designated at the reduction rate designating section, the dividing number designating section, and the extraction designating section with reference to FIGS. 7(*a*) to 7(*d*). FIG. 7(*a*) shows an example input image (hereinafter, input image), input at the image processing apparatus 1, which may be an image obtained by scanning an original image, in which the size of input image may be A2 size, for example. When a reduction rate is designated at the reduction rate designating section, a reduced image is output as shown in FIG. 7(*b*), in which A2 size image is reduced to A4 size image.

Further, when a dividing number of "4" is designated at the dividing number designating section, an input image of A2 size is divided and output as four A4-size images as shown in FIG. 7(*c*). Further, when a left-upper portion of input image of A2 size is designated as an extraction area at the extraction designating section, a left-upper portion having A4 size is extracted from the input image of A2-size and output as a A4-size image as shown in FIG. 7(*d*).

A description is now given to an operation of image processing system according to the first example embodiment with reference to FIG. 8. FIG. 8 shows a flowchart of an operation of image processing system according to the first example embodiment. As shown in FIG. 8, at first, a user may operate the display panel 104 of the image processing apparatus 1 to input a scanning instruction (step S801), and then the image processing apparatus 1 conducts a scanning operation (step S802).

When the scanning operation is conducted in the image processing apparatus 1, image data is generated, and a process of displaying an output destination designation screen (see FIG. 6) on the display panel 104 is conducted. Specifically, the image processing apparatus 1 may request information of the printer driver DB 305 to the system server 3 to obtain information of the image forming apparatuses 4, 5, 6, which is to be displayed at the output destination designation section as shown in FIG. 6 (step S803).

In response to the request from the image processing apparatus 1, the system server 3 transmits information of the printer driver DB 305 to the image processing apparatus 1 (step S804). With such a configuration, the image processing apparatus 1 can obtain information of the printer driver DB

305. As such, the main controller 110 of the image processing apparatus 1 may function as an output-able size information obtaining unit.

The image processing apparatus 1, which receives information of the printer driver DB 305 from the system server 3, displays the output destination designation screen including the preview window and the output destination designation section (see FIG. 6) on the display panel 104 (step S805). Accordingly, the operation display controller 140 may function as an output-able size information displaying unit.

At the output destination designation screen, a user operates a "transmit" button to input a confirmation instruction to confirm an output job (step S806), and then the image processing apparatus 1 transmits the output job including various designated-information and image data to the system server 3 (step S807). The various designated-information may include information designating any one of the image forming apparatuses 4, 5, 6 as an output destination. Accordingly, the output job is used as output-specifying information. In the image processing apparatus 1, the main controller 110 may function as an output-specifying information obtaining unit, an output size information obtaining unit, and an output-specifying information transmission unit.

When the system server 3 receives the output job from the image processing apparatus 1, the image processing plug-in 302 activates the printer driver 304 matched to an image forming apparatus designated as an output destination as described above, and the printer driver 304 conducts an image processing (step S808), in which the printer driver 304 may function as an image data converter.

Further, at step S808, in addition to the above-described data format converting process for converting one data format to another data format matched to the designated image forming apparatus, other processes such as reduction of image with a designated reduction rate, dividing of image with a designated dividing number, designated at the output destination designation screen (FIG. 6), can be conducted.

After completing step S808, the system server 3 transmits an output instruction to the image forming apparatuses 4, 5, 6 designated as the output destination (step S809). In the system server 3, the image processing plug-in 302 may function as image data transmission unit. With such a configuration, an operation of image processing system ends.

As described above, in the image processing system according to the first example embodiment, with the panel display plug-in 303, the maximum output-able sizes of the image forming apparatuses 4, 5, 6 which can be selected as an output destination can be easily checked using the display panel 104 of the image processing apparatus 1, which is used to input an image, before transmitting an output job to the system server 3, in which the printer drivers 304 matched to the image forming apparatuses 4, 5, 6 are installed in the system server 3.

With such a configuration, a user can select an output destination after confirming the maximum output size of each of the image forming apparatuses 4, 5, 6, and unsuitable processing can be prevented. Unsuitable processing may occur when an image forming apparatus not having the capability to output a large/wide size image is designated as an output destination, and only one portion of the image is resultantly output. Such unsuitable processing can be prevented by using the above-described configuration of the example embodiment.

As described above with reference to FIG. 5, the printer driver DB 305 stores information of the printer names and maximum output sizes of each of printers by linking information on the printer names and maximum output sizes using the registry of OS as described above. Generally-used registry of OS may not be configured to store the printer names and maximum output sizes by linking printer names and maximum output sizes.

In such generally-used registry, as described above, information on maximum output size can be included with the printer names as shown in FIG. 9. FIG. 9 shows one example information included in the printer driver DB 305 when a registry of generally-used OS is used as the printer driver DB 305. As shown in FIG. 9, each printer name is configured with two types of information: a first string of text indicating printer name itself (e.g., printer A) combined with a second string of text indicating a maximum output size of printer (e.g., A0) in a given style such as printer A_A0. Further, when the registry stores the printer information, the printer name may be linked with information of file path that stores a printer driver matched to the printer.

The style of information shown in FIG. 9 can be easily set by adding or including a string of text indicating a maximum output size of printer to the printer name when installing the printer driver in the system server 3.

Further, in the above described first example embodiment, the image processing apparatus 1 and the system server 3 are different apparatuses connected to different networks as shown in FIG. 1. However, the image processing apparatus 1 and the system server 3 can be configured as one integrated apparatus, for example, which means a hardware configuration of the image processing apparatus 1 can be used for implementing a function of the system server 3. Even in such a case, configurations of the above-described units may not be changed so much, in which difference may be a communication method for information such as whether information is communicated via the public line network 2, or information is communicated within one apparatus.

Further, as described above in the first example embodiment, when the image processing apparatus 1 and the system server 3 are different apparatuses, and connected to different networks, the image processing apparatus 1 and the system server 3 may be connected each other via the public line network 2 as shown in FIG. 1. In addition to such network connection, the system server 3 can be connected to the same network of the image processing apparatus 1, which is a user network for user using an image processing service. Even in such a case, configurations of the above-described units may not be changed so much, in which difference may be a communication method for information whether information is communicated via the public line network 2, or information is communicated within one network.

Further, in the above described first example embodiment, the image forming apparatuses 4, 5, 6 can be used as an output destination, which can be designated as the image forming apparatus to output images. However, the output destination is not limited to the image forming apparatuses 4, 5, 6, but other image forming apparatuses can be registered as output destinations. The output destination can be registered by installing the printer driver 304 matched to each of image forming apparatuses, and setting a transmission destination information such as internet protocol (IP) address of each of image forming apparatuses in the system server 3. Further, when a number of output destinations can be designated in the system, it may be preferable to set a function that an output destination can be searched in view of output size of sheet, network area, user ID, or the like.

Further, in the above described first example embodiment, an image is input to the image processing apparatus 1 by conducting a scanning operation. In addition, an image can be input to the image processing apparatus 1 using image data stored in a given storage such as a memory. In such a case, a user operates the display panel 104 of the image processing apparatus 1 to designate an area storing image data, which can be input. With such a configuration, the image processing apparatus 1 can obtain image data stored in a designated storing area, and then an image can be input to the image processing system.

Further, in the above described first example embodiment, after an image is input by conducting a scanning operation, information of the printer driver DB 305 is obtained, and then the output destination designation screen is displayed as shown in FIG. 8.

However, the output destination designation screen can be displayed using other method. For example, when a user requests a display of the output destination designation screen, steps S803 to S805 can be conducted to display the output destination designation screen but a preview may not be displayed because an image is not scanned and input, in which a process of preview display is omitted in step S805.

Second Example Embodiment

Figure 10:
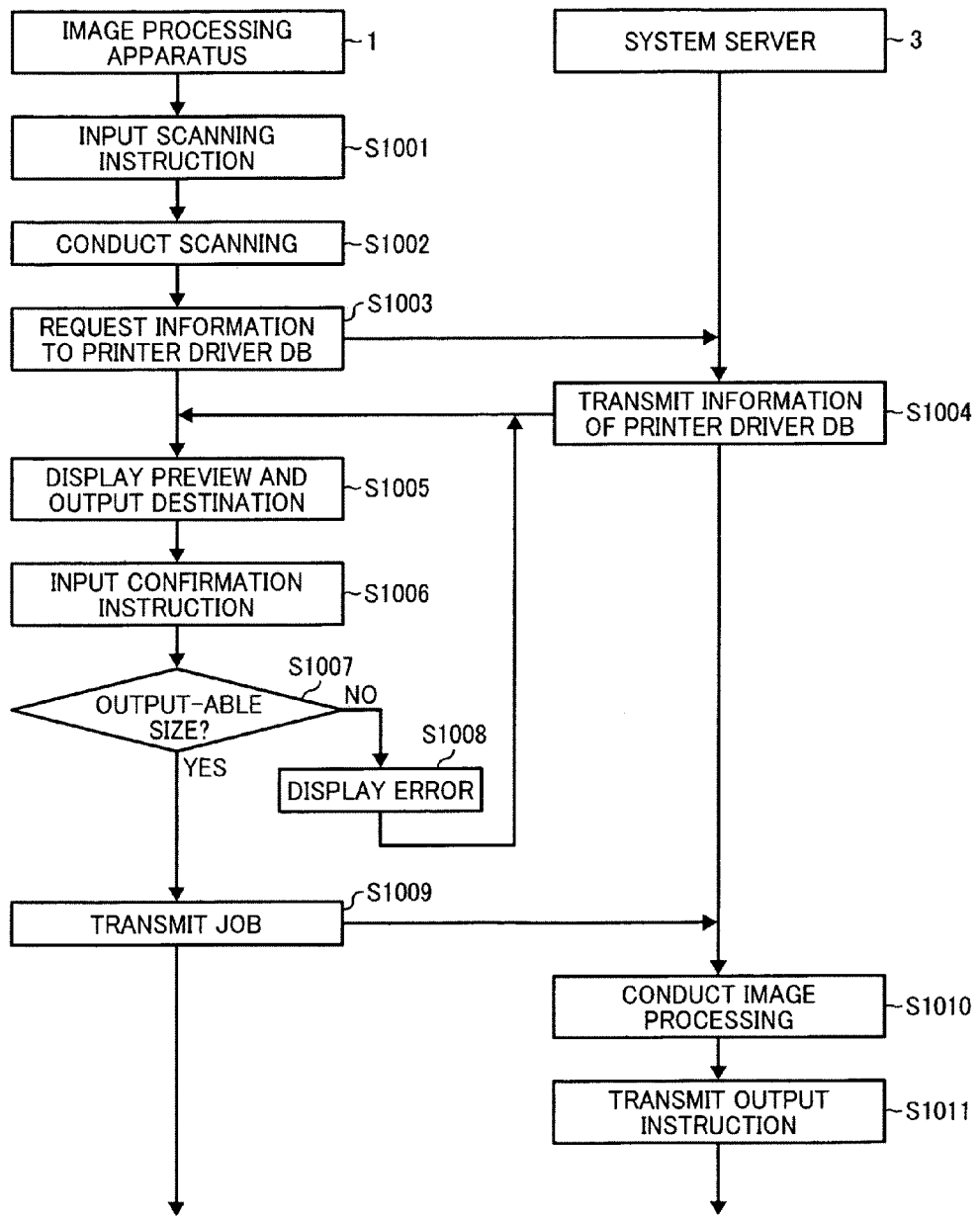
FIG. 10 shows a flowchart explaining operation of an image processing system according to another example embodiment.

A description is now given to a second example embodiment with reference to FIG. 10. In the first example embodiment, maximum output sizes at each of output destinations are displayed on a display using information registered in the printer driver DB 305, and a user can select a suitable outputting setting as an image-output setting from the displayed information.

In the second example embodiment, other configuration may be used, in which a system itself determines whether an image can be output with a suitable outputting condition based on an output size of designated image and a maximum output size at a designated output destination. Same or similar configurations of the first example embodiment may not be explained in the following description for the second example embodiment.

FIG. 10 shows a flowchart of an operation of image processing system according to the second example embodiment, which includes similar steps of the first example embodiment shown in FIG. 8. Specifically, steps S1001 to S1006 shown in FIG. 10 are conducted as similar to steps S801 to S806 shown in FIG. 8 as the first example embodiment.

When a user inputs a confirmation instruction at step S1006, the main controller 110 compares an output-size of image designated by the confirmation instruction and a maximum output size at a designated output destination to determine whether the designated output-size image is within an output-able size at the designated output destination such as for example image forming apparatus (step S1007).

If the designated output-size is determined to be within the output-able size based on a determination result at step S1007 (step S1007: YES), steps S1009 to S1011 are conducted similar to step S807 and subsequent steps of the first example embodiment described above.

By contrast, if the designated output-size is determined to be not within the output-able size based on a determination result at step S1007 (step S1007: NO), the main controller 110 controls the operation display controller 140 to display an error-reporting screen shown in FIG. 11 (step S1008). When an "OK" button is operated on the error-reporting screen in FIG. 11, the main controller 110 further controls the operation display controller 140 to display the output destination designation screen again on the display panel 104, and step S1005 and subsequent steps are repeated. Accordingly, the main controller 110 functions as an output-able size determining unit.

As such, in the image processing system according to the second example embodiment, when a user inputs a confirmation instruction, the image processing apparatus 1 compares the output-size of image designated by the confirmation instruction and the maximum output size at the designated output destination to determine whether the designated output-size is within the output-able size. With such a configuration, even if a user sets a wrong setting for output-size of image, the system itself can detect an error, by which an error can be reliably prevented, wherein the error may mean that an output job is conducted under a wrong setting and only one portion of image is output.

As such, in the second example embodiment, the image processing apparatus 1 can detect an error condition. Furthermore, an error condition can be detected by conducting steps S1007 and S1008 at the system server 3. Such configuration can be devised by providing a plug-in to determine the output-size of image in the system server 3. Specifically, the image processing plug-in 302 and the panel display plug-in 303 can be used as plug-ins to detect an error condition, in which the plug-in determines whether a maximum output size of designated output destination can satisfy a designated output-size of image to be output.

Further, in the second example embodiment, the process goes back to step S1005 from step S1008 in FIG. 10. However, if the image processing apparatus 1 or the system server 3 can be devised to determine that the designated output-size is an output-impossible size at step S1007, the image processing apparatus 1 or the system server 3 can automatically determine a reduction rate and/or dividing number to change an image-output setting based on a given setting preset in the system.

For example, when an image forming apparatus having a maximum output size of A4 is designated as an output destination and an output size of image is A3-size image, the image processing apparatus 1 may automatically determine a reduction rate of 71% to change an image-output setting so that an entire image of A3-size image can be output as A4-size image on one sheet, or the image processing apparatus 1 may automatically determine a dividing number of two (2) and outputs the A3-size image into two A4-size sheets by dividing the A3-size image into two sections. Such processing can be conducted by providing a plug-in suitable for implementing such function in the image processing apparatus 1 or the system server 3 such as for example image processing plug-in 302 and panel display plug-in 303.

Further, in the second example embodiment, steps S1007 and S1008 are conducted in addition to steps S1005 and S1006 as shown in FIG. 10, wherein steps S1005 and S1006 are included in the first example embodiment. However, steps S1007 and S1008 can be conducted without conducting steps S1005 and S1006. Even in such process, because information on maximum output size is required, step S1003 needs to be conducted before conducting steps S1007 and S1008.

In the above-described example embodiments, an image processing system includes a plurality of image forming apparatuses connected each other via a network. When an input image is to be output by using the plurality of image forming apparatuses, an output-image size and an output-able size at each of the image forming apparatuses can be preferably matched, by which an error condition such as unpreferable combination of output-image size and an output-able size at each of the image forming apparatuses can be avoided.

Further, the above described flowchart processes shown in each drawing can be prepared as a computer-readable program, which can be executed by a CPU of information processing apparatus. Such a program can be stored in a storage medium such as a semiconductor storage, an optical storage, a magnetic storage, or the like. Further, such a program and storage medium can be used in system, which may be different from the above-described example embodiments, and by executing the program using a CPU of system, an effect similar to the above-described example embodiments can be devised. As such, in the above-described exemplary embodiments, a computer can be used with a computer-readable program to control functional units used for an information processing system or apparatus. For example, a particular computer may control the information processing apparatus using a computer-readable program, which can execute the above-described processes or steps. Further, in the above-described exemplary embodiments, a storage device (or recording medium), which can store computer-readable program, may be a flexible disk, a CD-ROM (compact disk read only memory), DVD (digital versatile disk), a memory card, a memory chip, or the like, but not limited these. Further, a computer-readable program can be downloaded to a particular computer (e.g., personal computer) via a network, or a computer-readable program can be installed to a particular computer from the above-mentioned storage device, by which the particular computer may be used for the information processing system or apparatus according to example embodiments, for example.

In the above described example embodiment, an image inputting apparatus, to input an image to an image processing system connecting a plurality of image forming apparatuses via a network for outputting the input image using one of the plurality of image forming apparatuses, is devised. The image inputting apparatus includes an output-specifying information obtaining unit that, in response to an input operation to the image inputting apparatus, obtains output-specifying information including o-be-output image data and information designating at least one of the image forming apparatuses as an output destination to output the to-be-output image data; an output-able size information obtaining unit to obtain output-able size information linking information identifying each of the plurality of image forming apparatuses and output-able image size information at each of the plurality of image forming apparatuses; an output-able size information displaying unit to display an output-able image size of each of the plurality of image forming apparatuses on a display area disposed in the image inputting apparatus based on the obtained output-able size information; and an output-specifying information transmission unit to transmit the obtained output-specifying information to one of the image forming apparatuses designated as the output destination to output the to-be-output image data.

Further, as for the above described image inputting apparatus, the image processing system further includes an image data converter to convert image data, obtained by the output-specifying information obtaining unit, to a data format suitable for the image forming apparatus designated as the output destination; and an image data transmission unit to transmit the converted image data to one of the image forming apparatuses designated as the output destination.

Further, as for the above described image inputting apparatus, the output-able size information includes, for each of the image forming apparatuses, a first string of text as information identifying each of the image forming apparatuses and a second string of text as the output-able image size information for each of the image forming apparatuses, and the first string of text and the second string of text are combined to associate the information identifying each of the image forming apparatuses with the information indicating the output-able image size of each of the image forming apparatuses.

Further, as for the above described image inputting apparatus, the image data converter is provided for each of the plurality of image forming apparatuses and implemented by installing a software program suitable for each of the plurality of image forming apparatuses, and the output-able size information obtaining unit obtains information generated by installing the software program as the output-able size information.

Further, as for the above described image inputting apparatus, the image data converter is implemented by installing a printer driver suitable for each of the plurality of image forming apparatuses, and information generated by installing the printer driver suitable for each of the plurality of image forming apparatuses is stored in a registry, and the output-able size information obtaining unit obtains the information generated and stored in the registry as the output-able size information.

Further, as for the above described image inputting apparatus, the output-able size information displaying unit displays at least one of a reduction rate designating section, a dividing number designating section, and an extraction portion designating section on the display area of the image inputting apparatus. The reduction rate designating section is used to designate a reduction rate to reduce a size of the input image when outputting the input image. The dividing number designating section is used to designate a dividing number to divide the input image when outputting the input image as a plurality of divided images. The extraction portion designating section is used to designate a portion of the input image as an extraction portion of the input image when outputting the extraction portion of the input image.

Further, as for the above described image inputting apparatus, the output-able size information displaying unit displays a preview image of the to-be-output image on the display area of the image inputting apparatus using the image data obtained as the output-specifying information.

Further, as for the above described image inputting apparatus, the image processing system includes an output size obtaining unit to obtain information on output size of the to-be-output image data; and an output-able size determining unit to compare the output size of the to-be-output image data and an output-able image size of image forming apparatus designated as the output destination when outputting the image data. When the output-able image size of image forming apparatus designated as the output destination is smaller than the output size information obtained by the output size obtaining unit, the output-able size determining unit implements at least one of reducing a scale of the image to the to-be-output image data, dividing the input image into a plurality of divided images, and designating a portion of the to-be-output image data as an extraction portion for output.

In the above described example embodiment, a display control apparatus, to control a display style of display area, disposed at an image inputting apparatus used for inputting an image to an image processing system connecting a plurality of image forming apparatuses via a network for outputting the input image using one of the plurality of image forming apparatuses, is devised. The display control apparatus includes an output-able size information storage to store output-able size information linking information identifying each of the plurality of image forming apparatuses and output-able image size information at each of the plurality of image forming apparatuses; and an output-able size information transmission unit to transmit the output-able size information to the image inputting apparatus to display the output-able size information on a display area disposed at the image inputting apparatus in response to a request from the image inputting apparatus inputting the to-be-output image.

Further, as for the above described display control apparatus, the image processing system includes an output-specifying information obtaining unit that, in response to an input operation to an image inputting apparatus, obtains output-specifying information including to-be-output image data and information designating at least one of the image forming apparatuses as an output destination to output the to-be-output image data; an output-able size information obtaining unit to obtain output-able size information linking information identifying each of the plurality of image forming apparatuses and output-able image size information at each of the plurality of image forming apparatuses; an output-able size information display unit to display an output-able image size of each of the plurality of image forming apparatuses on a display area disposed in the image inputting apparatus based on the obtained output-able size information; an image data converter to convert image data, obtained by the output-specifying information obtaining unit, to a data format suitable for the image forming apparatus designated as the output destination; and an image data transmission unit to transmit the converted image data to one of the image forming apparatuses designated as the output destination.

Further, as for the above described display control apparatus, the output-able size information includes, for each of the image forming apparatuses, a first string of text as information identifying each of the image forming apparatuses and a second string of text as the output-able image size information for each of the image forming apparatuses, and the first string of text and the second string of text are combined to associate the information identifying each of the image forming apparatuses with the information indicating the output-able image size of each of the image forming apparatuses.

Further, as for the above described display control apparatus, the image data converter is provided for each of the plurality of image forming apparatuses and implemented by installing a software program suitable for each of the plurality of image forming apparatuses, and the output-able size information obtaining unit obtains information generated by installing the software program as the output-able size information.

Further, as for the above described display control apparatus, the image data converter is implemented by installing a printer driver suitable for each of the plurality of image forming apparatuses, and information generated by installing the printer driver suitable for each of the plurality of image forming apparatuses is stored in a registry, and the output-able size information obtaining unit obtains the information generated and stored in the registry as the output-able size information.

Further, as for the above described display control apparatus, the output-able size information displaying unit displays at least one of a reduction rate designating section, a dividing number designating section, and an extraction portion designating section on the display area of the image inputting apparatus. The reduction rate designating section is used to designate a reduction rate to reduce a size of the input image when outputting the input image. The dividing number designating section is used to designate a dividing number to divide the input image when outputting the input image as a plurality of divided images. The extraction portion designating section is used to designate a portion of the input image as an extraction portion of the input image when outputting the extraction portion of the input image.

Further, as for the above described display control apparatus, the output-able size information displaying unit displays a preview image of the to-be-output image on the display area of the image inputting apparatus using the image data obtained as the output-specifying information.

Further, as for the above described display control apparatus, the image processing system includes an output size obtaining unit to obtain information on output size of the to-be-output image data; and an output-able size determining unit to compare the output size of the to-be-output image data and an output-able image size of image forming apparatus designated as the output destination when outputting the image data. When the output-able image size of image forming apparatus designated as the output destination is smaller than the output size information obtained by the output size obtaining unit, the output-able size determining unit implements at least one of reducing a scale of the image to the to-be-output image data, dividing the input image into a plurality of divided images, and designating a portion of the to-be-output image data as an extraction portion for output.

In the above described example embodiment, a method of controlling an image processing system connecting a plurality of image forming apparatuses via a network for outputting an input image using one of the plurality of image forming apparatuses is devised. The method includes the steps of: obtaining an output-specifying information including a to-be-output image data and information designating at least one of the image forming apparatuses as an output destination to output the to-be-output image data in response to an input operation of the to-be-output image data to an image inputting apparatus; obtaining output-able size information linking information identifying each of the plurality of image forming apparatuses and output-able image size information at each of the plurality of image forming apparatuses; displaying the output-able size information for each of the plurality of image forming apparatuses on a display area disposed at the image inputting apparatus used for inputting the to-be-output image data; converting the image data obtained by an output-specifying information obtaining unit to a data format suitable for the image forming apparatus designated as the output destination; and transmitting the converted image data to one of the image forming apparatuses designated as the output destination.

Further, as for the above described method of controlling an image processing system, the output-able size information includes, for each of the image forming apparatuses, a first string of text as information identifying each of the image forming apparatuses and a second string of text as the output-able image size information for each of the image forming apparatuses, and the first string of text and the second string of text are combined to associate the information identifying each of the image forming apparatuses with the information indicating the output-able image size of each of the image forming apparatuses.

Further, as for the above described method of controlling an image processing system, the image data converter is provided for each of the plurality of image forming apparatuses and implemented by installing a software program suitable for each of the plurality of image forming apparatuses, and the output-able size information obtaining unit obtains information generated by installing the software program as the output-able size information.

Further, as for the above described method of controlling an image processing system, the image data converter is implemented by installing a printer driver suitable for each of the plurality of image forming apparatuses, and information generated by installing the printer driver suitable for each of the plurality of image forming apparatuses is stored in a registry, and the output-able size information obtaining unit obtains the information generated and stored in the registry as the output-able size information.

Further, as for the above described method of controlling an image processing system, the output-able size information displaying unit displays at least one of a reduction rate designating section, a dividing number designating section, and an extraction portion designating section on the display area of the image inputting apparatus. The reduction rate designating section is used to designate a reduction rate to reduce a size of the input image when outputting the input image. The dividing number designating section is used to designate a dividing number to divide the input image when outputting the input image as a plurality of divided images. The extraction portion designating section is used to designate a portion of the input image as an extraction portion of the input image when outputting the extraction portion of the input image.

Further, as for the above described method of controlling an image processing system, the output-able size information displaying unit displays a preview image of the to-be-output image on the display area of the image inputting apparatus using the image data obtained as the output-specifying information.

Further, as for the above described method of controlling an image processing system, the image processing system includes an output size obtaining unit to obtain information on output size of the to-be-output image data; and an output-able size determining unit to compare the output size of the to-be-output image data and an output-able image size of image forming apparatus designated as the output destination when outputting the image data. When the output-able image size of image forming apparatus designated as the output destination is smaller than the output size information obtained by the output size obtaining unit, the output-able size determining unit implements at least one of reducing a scale of the image to the to-be-output image data, dividing the input image into a plurality of divided images, and designating a portion of the to-be-output image data as an extraction portion for output.

In the above described example embodiment, a storage medium embodying a program that, when executed on a computer, causes the computer to execute a method of controlling an image processing system connecting a plurality of image forming apparatuses via a network for outputting an input image using one of the plurality of image forming apparatuses is devised. The method includes the steps of: obtaining an output-specifying information including a to-be-output image data and information designating at least one of the image forming apparatuses as an output destination to output the to-be-output image data in response to an input operation of the to-be-output image data to an image inputting apparatus; obtaining output-able size information linking information identifying each of the plurality of image forming apparatuses and output-able image size information at each of the plurality of image forming apparatuses; displaying the output-able size information for each of the plurality of image forming apparatuses on a display area disposed at the image inputting apparatus used for inputting the to-be-output image data; converting the image data obtained by an output-specifying information obtaining unit to a data format suitable for the image forming apparatus designated as the output destination; and transmitting the converted image data to one of the image forming apparatuses designated as the output destination.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image processing system comprising:
   at least one image forming apparatus;
   a server;
   an image input apparatus including,
      a first network interface configured to connect, via a network, the image input apparatus to the server and the image forming apparatus,
      a user interface configured to receive input from a user indicating a designated one of the at least one image forming apparatus and a corresponding designated output size, and
      a first controller configured to,
         obtain a maximum output-able size associated with the at least one image forming apparatus from the server via the first network interface in response to obtaining an input via the user interface,
         display, via the user interface, an output destination designation screen, the output destination designation screen including the maximum output-able size associated with each of the at least one image forming apparatus, and
         instruct the server to print image data at the designated image forming apparatus designated by the user by selecting the designated image forming apparatus via the output destination designation screen; and
   the server including,
      a server network interface configured to connect, via a network, the server to the image input apparatus and the image forming apparatus,
      a memory configured to store a printer database therein, and
      a server controller configured to,
         determine, via the printer database, a print driver and the maximum output-able size associated with each of the at least one image forming apparatus,
         first send, via the network interface, printer names of each of the at least one image forming apparatus to the image input apparatus,
         receive, via the server network interface, an indication of the designated image forming apparatus,
         install the print driver associated in the printer database with the designated image forming apparatus,
         convert the image data to print data using the installed print driver, and
         second send, via the server network interface, the print data to the designated image forming apparatus to print the print data.

2. The image processing system of claim 1, wherein
   the image input apparatus further includes a document scanning unit configured to scan a document and generate image data based on the scanned document; and
   the first controller is further configured to,
      generate, via the document scanning unit, the image data in response to the user input obtained via the user interface, and
      instruct the server to print the generated image data.

3. The image processing system of claim 2, wherein,
the output destination designation screen includes a reduction rate designation section configured to receive an input reduction rate for the generated image data, and
the first controller is further configured to request to print the generated image data according to the received input reduction rate.

4. The image processing system of claim 2, wherein,
the output destination designation screen includes a dividing number designation section configured to receive an input dividing number of the generated image data, and
the first controller is further configured to instruct the server to print the generated image data according to the input dividing number via the designated image forming apparatus.

5. The image processing system of claim 2, wherein,
the output destination designation screen includes an extraction portion designation section configured to receive an input extraction portion of the generated image data, and
the first controller is further configured to instruct the server to print the generated image data according to the input extraction portion via the designated image forming apparatus.

6. An image processing apparatus comprising:
a network interface configured to communicate with a server via a network, the server being connectable with a plurality of image forming apparatuses via the network;
a user interface; and
a controller configured to,
 obtain a maximum output-able size associated with the plurality of image forming apparatuses from a printer database associated with the server via the network interface in response to an input received via the user interface,
 display, via the user interface, an output destination designation screen, the output destination designation screen including the maximum output-able size associated with each of the plurality of image forming apparatuses, and
 instruct the server to print image data at a designated one of the plurality of image forming apparatuses, the designated image forming apparatus being designated by a user selecting the designated image forming apparatus via the output destination designation screen.

7. The image processing apparatus of claim 6, further comprising:
a document scanning unit configured to scan a document and generate image data based on the scanned document; and
the controller is further configured to,
 generate, via the document scanning unit, the image data in response to the user input obtained via the user interface, and
 instruct the server to print the generated image data via the designated image forming apparatus.

8. The image processing apparatus of claim 7, wherein
the output destination designation screen includes a reduction rate designation section configured to receive an input reduction rate for the generated image data, and
the controller is further configured to request to print the generated image data according to the received input reduction rate.

9. The image processing apparatus of claim 7, wherein
the output destination designation screen includes a dividing number designation section configured to receive an input dividing number of the generated image data, and
the controller is further configured to instruct the server to print the generated image data according to the input dividing number via the designated image forming apparatus.

10. The image processing apparatus of claim 7, wherein,
the output destination designation screen includes an extraction portion designation section configured to receive an input extraction portion of the generated image data, and
the controller is further configured to instruct the server to print the generated image data according to the input extraction portion via the designated image forming apparatus.

11. A server comprising:
a network interface configured to communicate with an image input apparatus and a plurality of image forming apparatuses via a network;
a memory configured to store a printer database therein, and
a controller configured to,
 determine, via the printer database, a print driver and a maximum output-able size associated with each of the plurality of image forming apparatuses,
 first send, via the network interface, printer names of each of the image forming apparatuses to the image input apparatus,
 receive, via the network interface, an indication of a designated one of the image forming apparatus,
 install the print driver associated in the printer database with the designated image forming apparatus,
 convert the image data to print data using the installed print driver, and
 second send, via the network interface, the print data to the designated image forming apparatus to print the print data.

12. The image processing system of claim 1, wherein the server is configured to send the printer names to the image input apparatus such that each of the printer names include the maximum output-able size for the associated image forming apparatus therein.

13. The image processing apparatus of claim 6, wherein the controller is configured to obtain the maximum output-able size associated with each of the at least one image forming apparatus by receiving, via the server, a printer name associated with each of the at least one image forming apparatus, the printer name including the maximum output-able size therein.

14. The server of claim 11, wherein the server is configured to send the printer names to the image input apparatus such that each of the printer names include the maximum output-able size for the associated image forming apparatus therein.

* * * * *